US009269076B2

(12) United States Patent
Edlund et al.

(10) Patent No.: US 9,269,076 B2
(45) Date of Patent: Feb. 23, 2016

(54) TECHNIQUES TO FACILITATE COLLABORATIVE SOCIAL CODING

(71) Applicant: International Business Machines Corporation, Armonk, NY (US)

(72) Inventors: Stefan B. Edlund, San Jose, CA (US); Kun Hu, San Jose, CA (US); James H. Kaufman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 13/841,621

(22) Filed: Mar. 15, 2013

(65) Prior Publication Data

US 2014/0282097 A1    Sep. 18, 2014

(51) Int. Cl.
*G06F 3/00* (2006.01)
*G06Q 10/10* (2012.01)

(52) U.S. Cl.
CPC .................................. *G06Q 10/103* (2013.01)

(58) Field of Classification Search
CPC ............. G06F 8/20; G06F 9/44; G06F 11/36; G06F 21/629; G06F 2221/21
See application file for complete search history.

(56) References Cited

U.S. PATENT DOCUMENTS

| | | | | |
|---|---|---|---|---|
| 5,008,853 A * | 4/1991 | Bly et al. | | 715/751 |
| 2002/0049962 A1 * | 4/2002 | Kelbaugh et al. | | 717/128 |
| 2004/0261053 A1 * | 12/2004 | Dougherty et al. | | 717/101 |
| 2005/0114475 A1 * | 5/2005 | Chang | | G06Q 10/10 709/220 |
| 2007/0124374 A1 * | 5/2007 | Arun | | G06Q 10/10 709/204 |
| 2007/0168946 A1 * | 7/2007 | Drissi | | G06F 8/71 717/110 |
| 2007/0283321 A1 * | 12/2007 | Hegde | | G06F 8/71 717/110 |
| 2008/0134298 A1 | 6/2008 | Nathan et al. | | |
| 2008/0244418 A1 * | 10/2008 | Manolescu et al. | | 715/753 |
| 2009/0199090 A1 * | 8/2009 | Poston et al. | | 715/255 |
| 2012/0005667 A1 * | 1/2012 | Deluca et al. | | 717/170 |
| 2012/0089960 A1 * | 4/2012 | Medvidovic | | G06F 8/71 717/105 |
| 2012/0198414 A1 * | 8/2012 | Chen et al. | | 717/102 |
| 2013/0159830 A1 * | 6/2013 | Lee et al. | | 715/208 |
| 2014/0068545 A1 * | 3/2014 | Lehmann et al. | | 717/101 |

OTHER PUBLICATIONS

Bani-Salameh, Hani, et al., "Introducing Social Development Environments", The 2nd International Conference on Information & Communication Systems May 22-23, 2011, 6 pages.
Cheng, Li-Te, et al., "Jazzing up Eclipse with Collaborative Tools", OOPSLA 2003—18th Annual ACM SIGPLAN Conference on Object-Oriented Programming, Systems, Languages, and Applications/Eclipse Technology Exchange Workshop Anaheim, CA Oct. 27, 2003, 5 pages.

* cited by examiner

*Primary Examiner* — Dino Kujundzic
(74) *Attorney, Agent, or Firm* — Cantor Colburn LLP

(57) ABSTRACT

Embodiments relate to method and program product enabling collaborative social coding. Social networking functionality is embedded and via that social networking functionality information relating to a particular function across a computing network is tracked. The tracked information is then accumulating and organized as relating to a particular function. Upon request receipt, information is then provided relating to the particular function including a list of those accessing that function.

18 Claims, 2 Drawing Sheets

FIG. 1

TECHNIQUES TO FACILITATE COLLABORATIVE SOCIAL CODING

BACKGROUND

The present disclosure relates generally to social coding and particularly to techniques that can facilitate collaborative social coding.

An integrated development environment or an IDE is a software application that provides programmers and designers of software the ability to provide multiple development utilities in a single cohesive unit. The facilities are comprehensive and can include source code editors, debuggers, compilers and interpreters, build automations and the like. Various tools are integrated in many IDEs to help simplify construction of graphical user interfaces (GUIs) and other components that help enable its use with object oriented software development.

IDEs are designed to maximize programmer productivity by providing components with similar user interfaces. The program typically provides many features for authoring, modifying, compiling, deploying and debugging software. IDEs help reducing setup time which can increase developer productivity. More comprehensive integration of all development tasks has the potential to improve overall productivity beyond helping with setup tasks. For example, code can be continuously parsed while it is being edited, providing instant feedback when syntax errors are introduced. That can speed learning a new programming language and its associated libraries.

Some IDEs are dedicated to a specific programming language but many have multiple language capabilities. In addition, while many IDEs are graphical based, text based IDEs also exist. The IDE may be a standalone application or may be included as part of one or more existing and compatible applications. In recent years, both web based and mobile device based IDEs have been gaining popularity. IDEs for developing hypertext markup language (HTML) applications are commonly used. Many web-site designers use an IDE that automates many of the tasks involved.

BRIEF SUMMARY

Embodiments relate to method and program product enabling collaborative social coding. Social networking functionality is embedded i and via that social networking functionality information relating to a particular function across a computing network is tracked. The tracked information is then accumulating and organized as relating to a particular function. Upon request receipt, information is then provided relating to the particular function including a list of those accessing that function.

The enhancement to a first integrated development environment (IDE) is allowed by viewing a second IDE using a social network environment. Displaying a list of available IDEs using a chat window, using the social network environment. Selecting the list for display by matching one or more characteristics pertaining to said first IDE that can be common with one or more available IDEs and retrieving the second IDE once selection is made from said list.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 1 depicts an example of a screen shot allowing collaborative social coding in accordance with an embodiment.

DETAILED DESCRIPTION

Figure 2:
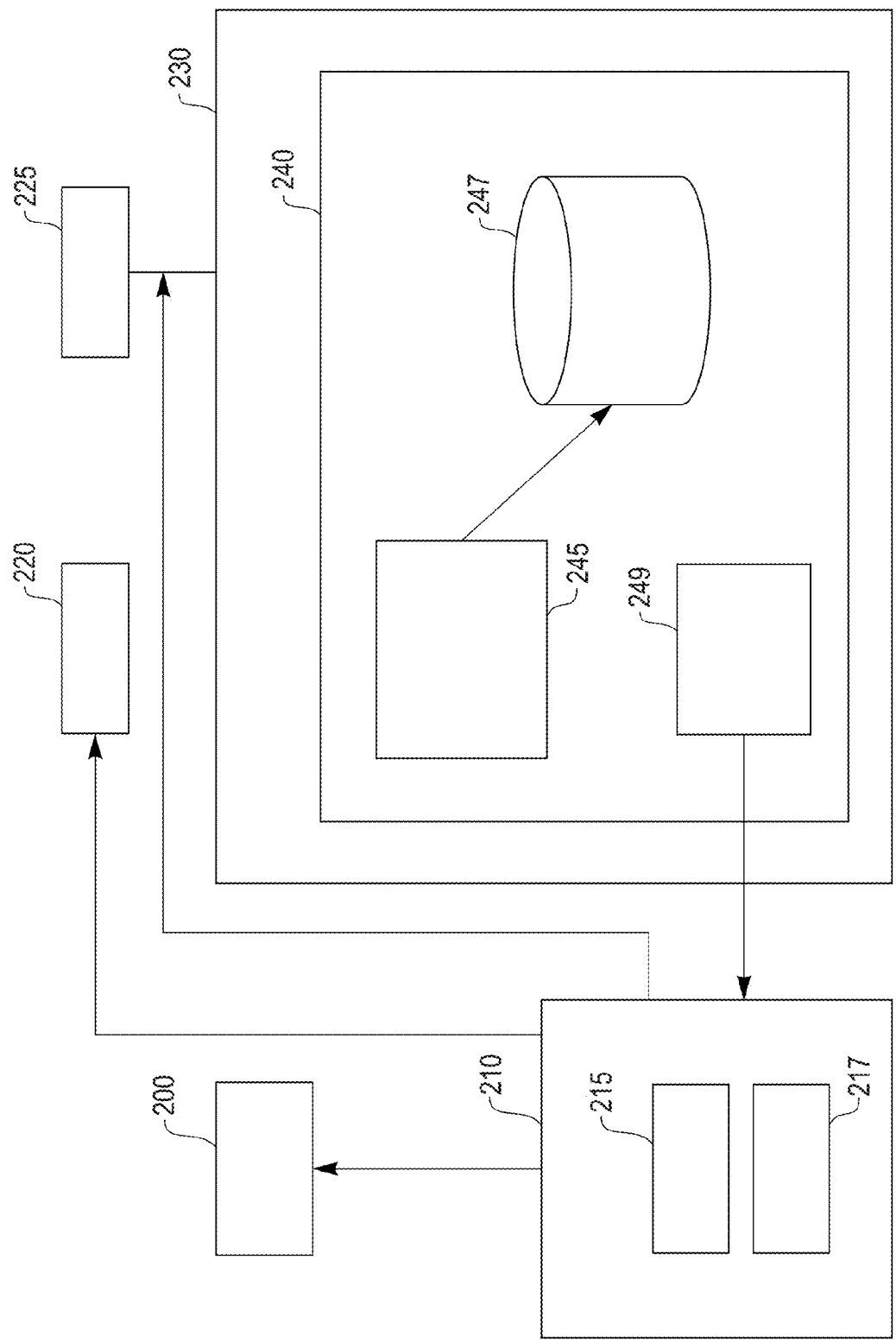
FIG. 2 depicts a bock architecture diagram enabling techniques for collaborative social coding in accordance with an embodiment.

Designing and architecting large software systems require project managers, software engineers, testers, user interface designers and many additional experts. However, actually coding particular components of the software is very much an individual task which can be time consuming. While techniques such as "pair programming" in some studies have produced shorter programs with better designs and fewer errors. Pair programming technique is one in which two programmers work together at one workstation. For example, one can write code while the other reviews each line of code that is being typed in and then the two often switch roles. Many programmers, however, feel uncomfortable in this arrangement which may be counterproductive from a creative point of view. Other examples of "social" programming are not very common and have not been successful.

Social networking is a recent phenomenon that has been helped tremendously with the advent of wireless technology and on-line services such as mobile devices and the Internet. A social networking group is similar to an online community with a group of individuals as its members. Social networking is often made possible by a social networking service. A social networking service is an online service, platform, or site that focuses on facilitating the building of relationships among people who share common interests, activities, backgrounds, or real-life connections. Social networking websites are known as social sites and often function like an online community. Once access is provided to a social networking website, the members begin socializing and exchanging ideas and pose questions and answers. Social networking sites allow users to share ideas, activities, events, interests and at times provide a neutral forum to ask questions and receive answers from a large cross section of the population anonymously. In recent years, social networking websites have also been used to interconnect employees of a particular company so that they can share ideas and solve problems. In addition, open communities have taken advantage of such websites to identify potential problems and help resolve them. Examples can include user groups, open source software developer communities or other relationships that are established around connecting customers and merchants/service providers.

Integrated software development environments (IDEs) is an area that can benefit greatly from "social" programming, that is programming that can be accomplished in part from collaborative development or review. IDE developers and development can benefit greatly with cohesive and group or social programming especially when combined with use of social networks, in particular social networks designed to help out with common needs of everyday programmers. The popularly of social networks enable easy access to a programming community. Some of the most popular social network in this context, can be those that provide access to programmers that are working on the same or similar project. This is a collection of programmers with experience of using a particular software library or especially those with application programming interfaces (APIs). Programmers with experience using a non-commercial or commercial product such as relational database, can also benefit greatly by this. Social networking can be used that is specific to a company or more oriented toward the general developer communities. Unfortunately, despite popularity of social networking challenges have not allowed developers and programmers use social networking in development and modification of IDEs.

Figure 1:
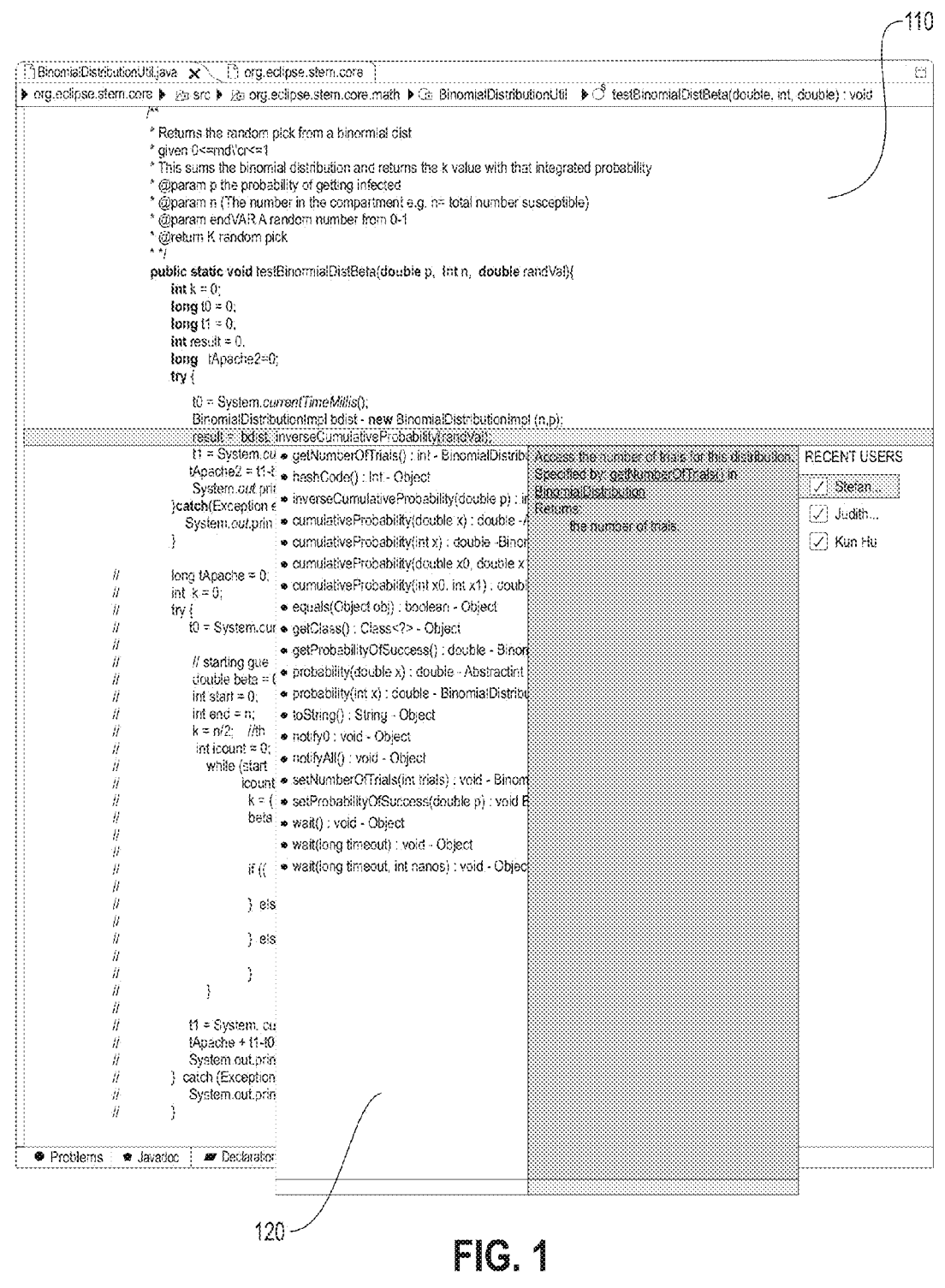

In one embodiment, a technique is proposed that makes such collaboration, especially for IDEs easy and beneficial. FIG. 1, is an exemplary screen display illustration according to one embodiment that enables collaborative social coding. In one example, a programmer may be developing an application, project or other similar task with certain functionalities as shown at 110. In this embodiment, as will be discussed in more detail, a technique is provided to combine integrated software development environments (IDEs) with social networks, in particular social networks that are designed to help with common needs of everyday programmers or users. This will allow easy collaboration and access between users/programmers that work on the same project, whether employed in the same company or entity. In addition, a collection of programmers with experience using a particular software library or API can also collaborate and combine their efforts. In a different example, programmers with experience using, configuring, or customizing, a non-commercial or commercial product (e.g. relational database) can also be able to benefit from such techniques. In the embodiment provided in FIG. 1, social network functionality can be embedded directly into the IDE which is or will be used by the programmer/user. In one example, certain IDE features and functionalities such as content assist can be used that will bring up a window showing available methods (with documentation if available) an object accepts. Referring back to FIG. 1, an example of how a user interface can be used to address such needs.

In FIG. 1, as discussed an example of an embodiment is provided that has the content assist feature. This feature is used to bring up a window showing available methods (with documentation if available) that can be used at 120. In one embodiment, the same window can also display a list of collaborators that recently used a particular function with a way of contacting the collaborator with additional questions or requests as needed. In one embodiment, the process can be controlled by a manager application that can have the content assist feature integrated into it. The manager can be configured to provide one or more functions using a processor.

The example provided in FIG. 1 provides one way that a user interface may look like with the understanding that as can be appreciated by those skilled in the art many other alternate methods are available. In one example a screenshot can be provided using conversation between two individuals, such as programmers or friends. The screenshot example shows these friends have used an API embedded facility that can provide comments directly into a code assist feature on an IDE. An embedded social network component can be used to seamlessly track tasks and actions of a programmer and builds a personal programmer profile. By combing the profiles of many programmers across projects, useful information can be mined and used for future collaborations and mutual support.

In a different example, a programmer is the creator/author of an API. In one embodiment, the technique provides a way to contact the programmer directly with questions. In addition, notifications are provided or sent when the implementation of an API used by a programmer changes. In other embodiments, the content assist or manger can provide an option for displaying or providing information about the frequency or use or change to a particular API. This will allow among other things to provide an indication of the maturity of the API, or even which API to pick if multiple options are available. Of course, this is not related to APIs and can relate to any other functionality as can be appreciated by one skilled in the art.

In a different embodiment, statistics can be collected across multiple projects as well. For example, if taking the second example of a programmer developing API's, statistics of API errors can be taken. In yet another embodiment, a collection of feature requests or even error or bug reports from the users of a particular function (IDE, API etc) can be requested. The requests can even be accumulated and stored in a repository for future feature requests in storage. This feature can easily be designed to take advantage of available management systems such as "clearquest" or "bugzilla".

For a specific feature request, in one embodiment, the creator of an IDE or API or other features can also contact the user of record for further information. However, if the feature request already exists, other users could refer to the source and comments on it (information sharing).

In one embodiment, a problem solving logger can be provided by the manager. The logger provides logging function in general. Some examples can be providing logs for communication or even conversation happening between users and creator (API, etc.) when the user encounters problems or has further questions or comments regarding a specific function. In one embodiment, consent of all parties can be required before the conversation could be automatically integrated into a tutorial system such as an online supporting system for this particular function. The consent can be provided in a number of ways such as by clicking an agreement form on line. Once the log is provided, in one embodiment, it can then be accessed publicly or with certain constraints such as by requiring use of a password or other such similar methods. The further constraint requirement can be defined in a number of ways such as by the creator/author himself or herself. In this way the creator/author could avoid repetitive conversations on same topics again and again for efficiency purposes.

Consequently, the embedded social network component not only seamlessly tracks the tasks and actions of the users and programmers but also has the ability to build a personal user/programmer profile and use the profile across projects and mines all useful information. As discussed above, other examples of functionality that can be provided as the ability to contact the creator (author) of an API directly with questions, receiving notifications when the implementation of an API used by a programmer/user changes, indicates the frequency a particular API is used (thus providing an indication of the maturity of an API, or even which API to pick if multiple options are available). Statistics can be collected across multiple projects as discussed as well. Such statistics can be used in a variety of ways including monitoring API errors, especially when automated (tested) as captured by the system.

FIG. 2 is a block diagram illustrating an overview of a general architecture of a system as per one embodiment. In FIG. 2, the IDE is shown at 210 in providing processing communication through a social coding component having a plugin in one embodiment. The social coding plugin is shown at 215. In this embodiment, IDE is extended by a Social Coding Plugin component. The purpose of the plugin in this embodiment is to enable a window, dialog panel, or view, to establish communication. In one embodiment this is a chat window to provide a one on one as well as group discussion. Some examples of available functionality enabling the chat that can be easily integrated into the technique are SKYPE or GOOGLETALK.

In a different embodiment, the window can provide in person chatting or textual or other image oriented recorded information. In one embodiment, the window can provide the programmers/users an option for a screen share to see a second IDE. The window can include a public or private social network. Some possible chat options include an IDE chat window that includes certain persons (friends, project leaders, programmer of a feature etc.) when they are available on-line. Information about one or more persons can be provided. Such information can pertain to the author/creator of a code or even include information about specific classes, methods or APIs. This can be integrated into the code assist feature as well. The social coding can also integrate information about who and how recently a feature was used or even modified. The social coding or IDE can integrate information about "friends" who authored code (classes, methods, APIs) and even turn it into a Social Network Discussion or View (including discussion history). In one embodiment the IDE in this case can include or integrate a code assist feature. In one embodiment, the check in/check-outs are forwarded to a "social coding server".

In one embodiment, the program manager can also provide an option to detect and monitor check-in/checkouts of files, such as using a version control systems (VCS). The version control systems can be monitored and are configured by the user.

In one embodiment, earlier accumulated information can be stored in storage to be used at any time. This information can then be retrieved as needed. In addition, the user can ask for new created files to be parsed to detect new libraries and new features and API's. In this embodiment, the new created files are parsed to also detect uses of existing libraries and API's and features, or alternatively to detect new uses of existing libraries and API's. Information relating to libraries, features and API's created and used by one or more particular (or generally) users in a programmer profile database can also be established in one embodiment.

In one embodiment, a request for those who authored code can return an answer by querying the programmer profiles of selected individuals as identified by name or other classification. The same can be retrieved for individuals or "friends" who recently modified code by querying such information by accessing a programmer profile database. In one embodiment, the requests of other people requesting or querying certain information can be provided to the original user so that the user can understand, for example, who has included or used code. In addition, upon receiving requests for new notifications such notifications can be display to a user (programmer). In one embodiment, a "wall" posting that's owned by the creator of API containing information/conversation between users and API creators can also be used to include information such as API creators and this information can also be controlled so that access to such wall postings is manipulated by the user as desired accordingly.

FIG. 2, provides an illustration of a block diagram showing a general architecture for an environment that allows collaborative coding as per one embodiment. Many of the concepts provided in FIG. 2 is already discussed and the figure is provided to aid understanding. As can be appreciated by those in the art, FIG. 2 only provides an illustrative example and other alternative embodiments are possible. The instant message as shown in 200 is provide by a device or processor that is in processing communication with an IDE (also provided by an electronic device or process). The IDE is shown at 210 and can include other features such as a plug-in 215 and a tracker 217. The instant messaging is also accessed by other electronic devices such as one or more VCS devices shown here as 220 and 225. The IDE is in communication with a computing environment 230. In one embodiment, the environment can be a social network environment. The environment can include one or more electronic components and processors. In this example, the environment provides a server 240, storage 247 and query processor 249. The manager application (not illustrated) can be incorporated in the IDE or in the environment 230.

Consequently, as discussed techniques can be provided to embed social networking functionality into an integrated development environment (IDE) by tracking via said social networking functionality information relating to a particular function across a computing network. The computing network can comprise a variety of processors and computers or other digital devices in processing communication with one another. These computers, processors and digital devices will be referred as nodes for ease of understanding. The other digital devices can include but is not limited to both wireless and wired devices, mobile devices, printers, displays and memory (internal and external) and other storage devices. In one embodiment, these nodes have access to social networking sites and in one embodiment, the user(s) or programmers using them are in communication with one another through the social networking site. The technique allows the accumulation and organization of the tracked information about a particular function (i.e. API). Upon receipt of a request, information relating to the particular function can be provided including a list of those accessing the function. A user interface and a display is provided, in one embodiment, to enable requesting of information about said API by a user and enabling displaying the requested information to a user and the list of accessing to said API is provided through connection with a social network. The tracked information can include a variety of information such as list of collaborators that (recently) used the API, information pertaining to contacting these collaborators which may further include their name and email. The tracked and accumulated information can also include profile of users/programmers that have or are modifying a function or an API and information pertaining to contacting them as well. The technique can also allow for notifications to be sent. For example, a notification can be sent every time an API is altered. In one embodiment, a function or an API can include a software library, an object oriented class or an object oriented class method.

In one embodiment, a plurality of APIs can be tracked and information about them can be accumulated. In addition, the usage of a plurality of users or programmers can also be tracked. The combined information can also be accumulated in this and other embodiments that include frequency of use of each API, categorizing accumulated and combined information to indicate API's availability by multiple options and age of maturity, and general statistics about the API including information related to API errors. In one embodiment, a logging function is included that can provide information about the API such as answers to questions and a tutorial for using the API.

To allow for communication with the programmer/user, in one embodiment, user interface is included or attached to the nodes which allow the display of a communication window or the like as can be appreciated by those skilled in the art. As discussed before, several nodes can be in processing communication with one another at the same time and each is enabled to be used by different users/programmers. These users/programmers can simultaneously make collaborative changes and simultaneous communication with one another regarding a particular API. Information can be provided about these users/programmers to one another that can include availability for instantaneous communication; list of users that are using or have authored at least one these APIs and discussion history about each particular API between different users in the past or as is happening simultaneously.

In one embodiment, information about usage of a user/programmer can be stored in a Programmer Profiles Database such as in a memory. The memory can be also used to store information about any API. In one embodiment, the API creator can control the dissipation of such information. The information about selected API as monitored, can be also recorded in the Programmer Profile Database. This information can include the creation of new API's and information relating to uses of existing API's. The information can also include any uses of existing API that are detected by parsing files created or updated by a user/programmer. Other information that can be stored can include instances where the requestor notified has used the modified API in the past.

In another embodiment, information about checking in and checking out of files can also be stored and monitored relating to an API. Such storage and monitoring can be further performed by utilizing a version control system (VCS) which is then forwarded to a social coding server. The VCS can be configured by a user/programmer and the files created or updated can be retrieved from the VCS (from memory).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   embedding social networking functionality into a computing integrated environment (IDE);
   tracking via said social networking functionality information relating to a particular function across a computing network;
   accumulating and organizing said tracked information about said particular function via the IDE, wherein the particular function is an application programming interface (API);
   upon receipt of a request for information, providing information relating to the function, said information including a list of those accessing the function, a name of creator of the function and information pertaining to contacting said creator, and a frequency of use of the function,
   wherein a display is provided to enable requesting of information about said function by a user and enabling displaying said requested information to the user.

2. The method of claim 1, wherein the computing network includes a plurality of computers in communication with one another through a social network.

3. The method of claim 2, further comprising notifying requestor of information every time an API is altered.

4. The method of claim 2, wherein information about checking in and checking out of files about an API is also monitored using a version control system and said information is forwarded to a social coding server.

5. The method of claim 4, wherein said version control systems is configured by a user and files created or updated are retrieved from a version control system.

6. The method of claim 2 where an API can include a software library, an object oriented class or an object oriented class method.

7. The method of claim 1, wherein said tracked information include list of collaborators that used said API and information pertaining to contacting said collaborators.

8. The method of claim 7, wherein said tacked and accumulated information includes profile of users modifying said API and information pertaining to contacting said users.

9. The method of claim 1 wherein information about a plurality of APIs is tracked and accumulated as well as usage of a plurality of users.

10. The method of claim 9, further comprising categorizing accumulated and combined information to indicate API's available by multiple options and age of maturity.

11. The method of claim 10, wherein said accumulated information also includes statistics related to API errors.

12. The method of claim 9, wherein a logging function is included that provides information about said API including answers to questions and a tutorial for using said API.

13. The method of claim 1, wherein a window is provided for user communication.

14. The method of claim 13, wherein several nodes are in communication with one another each being enabled to be used by different users and said users can simultaneously make collaborative changes and simultaneous communication with one another regarding an particular API.

15. The method of claim 13, wherein said information is stored in a programmer profiles database.

16. The method of claim 15 wherein information stored about an API is controlled by said API creator.

17. The method of claim 1, wherein information about selected API are monitored and recorded in a programmer profile database, including creation of new API's and information relating to uses of existing API's and use of existing API are detected by parsing files created or updated by a user further comprising compiling statistics related to API errors via an automated testing unit.

18. A computer program product comprising a non-transitory computer readable storage medium having computer readable program code embodied therewith, said computer readable program code being executable by a processor to:
    embed social networking functionality into a computing integrated environment (IDE);
    track via said social networking functionality information relating to a particular function across a computing network;
    accumulate and organize said tracked information about said particular function via the IDE, wherein the particular function is an application programming interface (API); and
    upon receipt of a request for information, providing information relating to the function including list of those accessing the function, a name of creator of the function and information pertaining to contacting said creator, and a frequency of use of the function,
    wherein a display is provided to enable requesting of information about said function by a user and enabling displaying said requested information to the user.

* * * * *